J. H. BURKE.
COMBINED RELISHING AND BORING AND GROOVING MACHINE.
APPLICATION FILED JAN. 7, 1910.
985,248.
Patented Feb. 28, 1911.
2 SHEETS—SHEET 1.
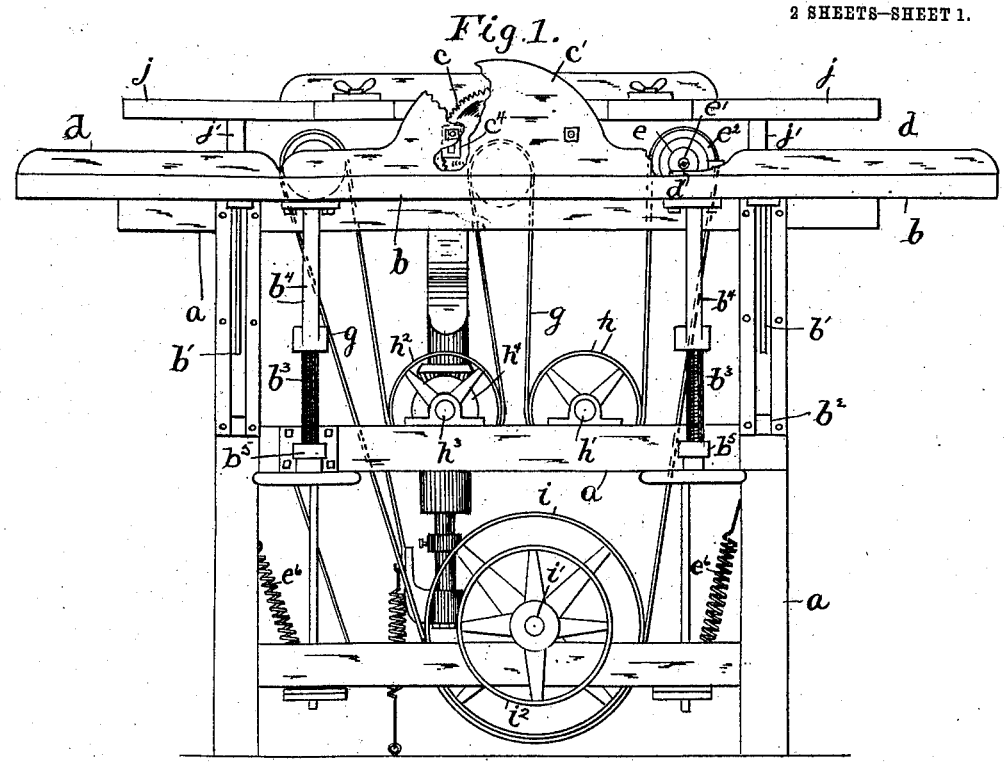
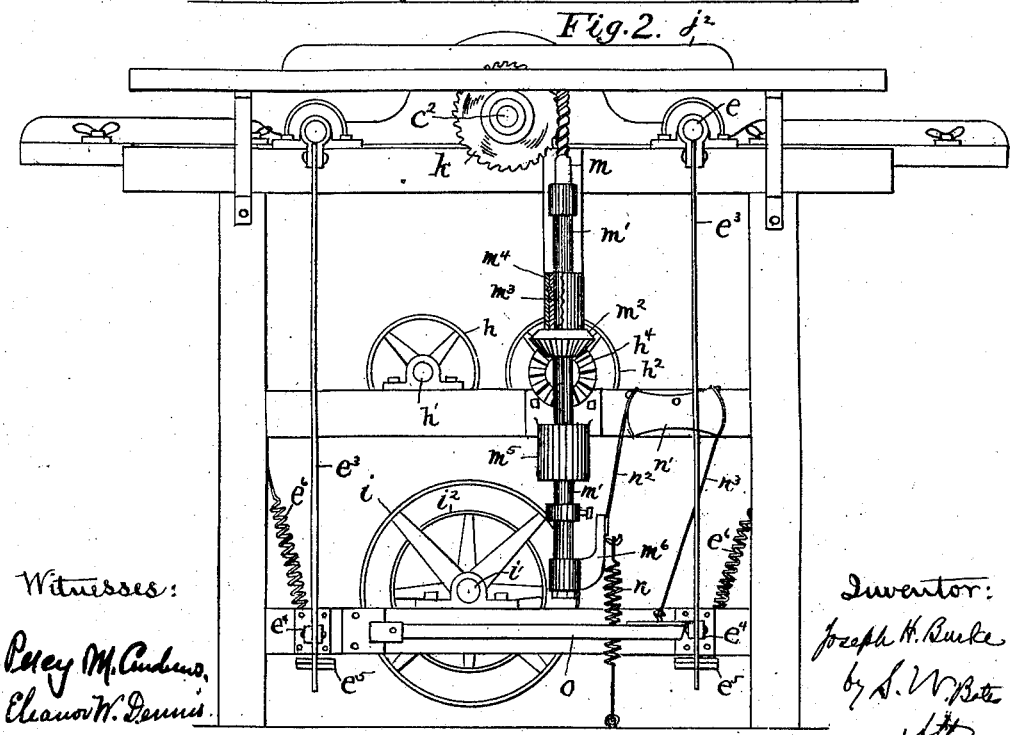
Witnesses:
Inventor:
Joseph H. Burke J. H. BURKE.
COMBINED RELISHING AND BORING AND GROOVING MACHINE.
APPLICATION FILED JAN. 7, 1910.
985,248.
Patented Feb. 28, 1911.
2 SHEETS—SHEET 2.
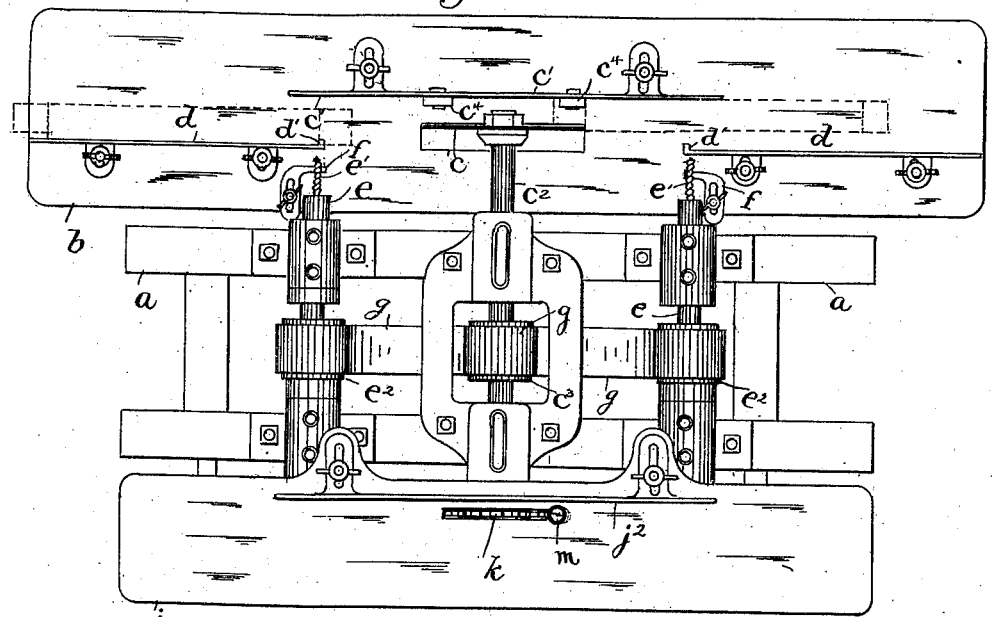
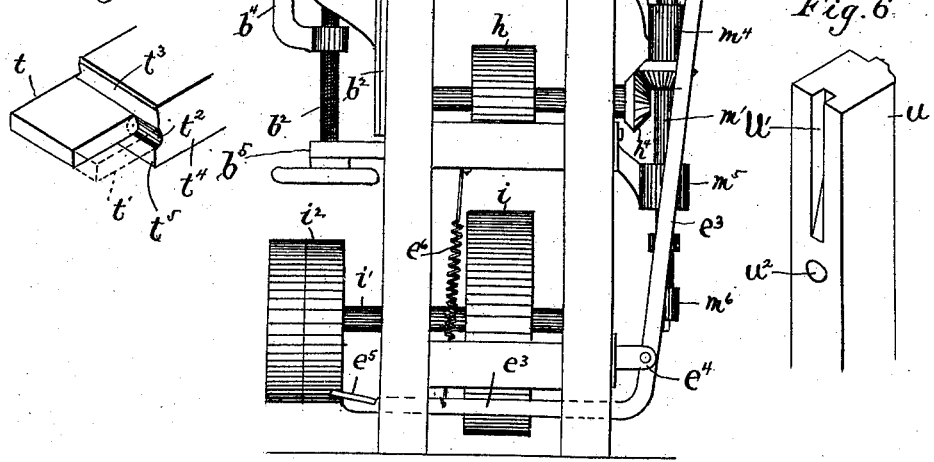
Witnesses:
Inventor:
Joseph H. Burke
by S. W. Bates
Atty.

UNITED STATES PATENT OFFICE.

JOSEPH H. BURKE, OF PORTLAND, MAINE.

COMBINED RELISHING AND BORING AND GROOVING MACHINE.

985,248.  Specification of Letters Patent.  Patented Feb. 28, 1911.

Application filed January 7, 1910. Serial No. 536,781.

*To all whom it may concern:*

Be it known that I, JOSEPH H. BURKE, a subject of the King of Great Britain, and a resident of Portland, in the county of Cumberland, State of Maine, have invented certain new and useful Improvements in Combined Relishing and Boring and Grooving Machines, of which the following is a specification.

My invention relates to a machine for relishing sash rails and it is preferably combined with boring and grooving devices for forming the cord holding groove in the sash rail.

These relishing machines, as is well known, are designed to cut an oblong section from one of the lateral edges of the tenon formed on the end of a sash rail and they employ a table on which the rail rests, a saw for cutting a longitudinal saw scarf from the end of the tenon to a point near its base and a bit the diameter of the thickness of the tenon journaled at right angles to the saw and on a level with the tenon, for cutting out the section partially removed by the saw. As the side rails are commonly made, the tenon is nearer one face than the other and in the single acting machines as they have hitherto been made, after the tenon on one end of the rail had been cut and the relish or waste piece had been removed, it was necessary to readjust the height of the table with relation to the bit, to bring the latter at the level of the tenon when the rail was turned over to cut the other end. It was also necessary in such a case to reverse ends of the rail.

The object of my invention is to construct a machine in which both ends of the top or bottom rails may be relished without adjusting the height of the table or of the bit, and without changing ends of the rails. I accomplish this result by hanging the saw in such a way that the work can be fed to it from either side and providing a cutting-off bit on each side of the saw. With this arrangement one end of the rail may be relished and then the rail passed along to the other side of the saw and run in from a contrary direction relishing the opposite end. In each operation the same face of the rail will lie on the table, each bit will be the same height above the table and no intermediate adjustment has to be made.

Combined with the relishing machine, I provide a grooving and boring machine for forming the sash cord grooves in the sides of the rails so that the two operations of relishing and grooving may be quickly and easily performed on the same machine.

I have illustrated my invention by means of the accompanying drawing in which is shown the form of my invention which I employ in practical work although it is to be understood that various modifications may be made in the machine while keeping within the limits of my invention.

In the drawing, Figure 1 is what I will call for convenience a front elevation of the machine, with certain portions cut away, Fig. 2 is a rear elevation, Fig. 3 is a plan, Fig. 4 is an end elevation, Fig. 5 is a perspective view of the end of one of the top or bottom sash rails, and Fig. 6 is a detail of the side rail after being grooved and bored and as put on the market.

The machine is supported by a suitable frame $a$ with a saw table $b$ on the front side and a saw table $j$ on the rear side considerably above the level of the table $b$ for the reason hereinafter explained.

The table $b$ is so supported as to be vertically movable for the purpose of adjustment as is common in such machines. As here shown, the table supporting brackets $b'$ move in vertical guides $b^2$. The table is raised and lowered by means of a screw $b^3$ journaled in a bracket $b^5$ extending out from the front of the frame and engaging a screw threaded opening in the lower end of the hanger $b^4$. As here shown, there is one of the sliding brackets $b'$ and one of the adjusting screws at each end of the table so that the ends may be adjusted to different heights.

The relishing saw is journaled in the frame in such a manner that work can be fed to it from each end of the machine. As here shown, the saw $c$ which is preferably made with cutting off teeth, is secured on one end of a saw arbor $c^2$ journaled centrally in suitable bearings in the frame, preferably above the level of the table $b$, so that the work will be done on the lower half of the saw. The saw arbor $c^2$ is provided with a pulley $c^3$ operated as hereinafter shown by a common driving belt $g$.

For the purpose of guiding the work to the saw, I provide an adjustable gage $c'$ which extends out at each side of the saw and parallel therewith. Means are provided to hold the tenon and the rail end down against the upward action of the saw and to stop the infeed of the tenon at the shoulder. For this purpose I provide as here shown two stops $c^4$ each secured to the inner face of the gage $c'$ directly opposite the edge of the saw. Each of the stops $c^4$ is composed of a block having a vertical slot for adjustment and is adjustably secured by a suitable bolt extending through the gage $c'$. The lower end of the stop $c^4$ is adjusted so as to just allow the tenon $t$ shown in Fig. 5, to pass under it and its outer edge is placed directly opposite the edge of the saw so that the saw scarf will terminate at the shoulder $t^3$ as said shoulder contacts with the stop $c^4$. The relish $t'$, indicated in dotted lines in Fig. 5, is removed by a bit, one of which is located at each side of the saw and at right angles to the plane of the saw.

As shown, each bit $e'$ is held in the end of a longitudinally movable bit arbor $e$ journaled in the frame and preferably parallel with the saw arbor and in a horizontal position. The location of the arbor is such that the center of each bit is the same distance above the table as the center of the tenon and the bit is substantially the same diameter as the thickness of the tenon. The outer end of the bit is sufficiently far from the gage $c'$ so as to allow the rail to be fed to the saw. An adjustable gage $f$ is provided to stop the arbor at its outer position and a gage $d$ having a shoulder $d'$ is provided to hold the rail in position to be bored, the front edge $t^4$ of the rail being held against the face of the gage $d$ and the lower shoulder $t^5$ resting against the shoulder $d'$ of the gage $d$.

Each of the bit arbors $e$ is provided with a pulley $e^2$ here shown as being laterally in line with the pulley $c^3$. The bit arbors are each moved longitudinally inward to bring the bit into operation by means of a foot lever $e^3$ here shown as a bent lever pivoted to a bracket $e^4$ at the rear of the machine, extending forward and terminating in a foot piece $e^5$ at the front of the machine and near the floor so as to be convenient to the foot of an operator standing at the front of the machine. The upper rear end of the lever $e^3$ is connected with the rear end of the bit arbor $e$ so as to permit the latter to rotate and to be moved longitudinally to operate the bit. Springs $e^6$ are secured to the levers $e^3$ to retract the bit arbors after the bits have done their work.

In order to facilitate the working of sash rails rapidly I combine a boring and grooving mechanism for boring and grooving the side rails or stiles with the relishing machine, Fig. 6 showing the work done on my machine. In this figure $u$ is a section of the side rail, $u'$ the cord groove and $u^2$ the knot recess.

According to my invention I secure a circular groover $k$ on the rear end of the saw arbor $c^2$ the groover extending up through a slot in the table $j$. A gage $j^2$ is secured to the table adjacent to the groover $k$ and serves to guide the sash rails as they are fed to the groover to form the sash cord slot. The knot recess which is adjacent to the end of the cord groove is made by a vertically disposed bit $m$ held normally below the table $j$ and secured in the end of a longitudinally movable spindle $m'$.

Means are provided for forcing the spindle $m'$ upward so that the upper end of the bit will enter the sash rail in the line of the groove. For this purpose the lower end of the spindle is stepped in a foot piece $m^6$ and the spindle $m'$ extends upward through a bearing $m^5$ and a hollow shaft $m^3$ which is journaled in a box $m^4$. The spindle is splined to the hollow shaft $m^3$ in any well known manner so that the rotation of the shaft imparts rotation to the spindle while permitting its longitudinal movement. The foot piece is raised by means of a strap $n^2$ secured by its lower end to the foot piece and by its upper end to one end of a lever $n'$ pivoted to the frame of the machine. The other end of the lever is connected by a cord or strap $n^3$ to foot lever $o$. Thus when the foot lever is depressed the spindle and bit are raised and when the foot is released the spindle is drawn down by a spring $n$.

Power is applied to rotate the spindle by a miter gear $m^2$ secured to the lower end of the hollow shaft $m^3$ and engaging a corresponding miter gear $h^4$ on a horizontal shaft $h^3$. Power is applied to the main driving shaft $i'$ as shown by means of a tight and loose pulley $i^2$, the shaft $i'$ having thereon a driving pulley $i$. Power is imparted from the driving pulley $i$ to the saw arbor and the three bits by means of the belt $g$ utilizing a pair of auxiliary pulleys $h$ and $h^2$ mounted on shafts $h'$ and $h^3$ respectively between the pulley $i$ and the top of the machine.

On the rear end of the shaft $h^3$ is the miter gear $h^4$ engaging the miter gear $m^2$ already described.

The belt $g$ connects the various pulleys as follows: It passes under the driving pulley $i$ thence one portion passes up outside of one of the pulleys $e^2$ and the opposite portion passes over the other pulley $e^2$. From each pulley $e^2$ the belt now passes down to the outside of the auxiliary pulleys $h$ and $h^2$, thence underneath these pulleys up on the inside and over the pulley $c^3$. It will thus be seen that the belt $g$ imparts motion at once to the saw arbor and the two bit arbors and through the miter gear $h^4$ to the bit spindle $m'$ and bit $m$ and the connections are so made that the motions of the several rotatable members are all in the proper direction.

In the practical operation of my machine, the relisher may be operated by one or two men. When one man operates it, he may stand in front of the machine at one side of the center within easy reach of one of the foot pieces $e^5$. The rail is laid on the table face down and by means of the gage $d'$ the rail is held in position and the cutting off hole is bored in the edge of the tenon at its base as indicated at $t^2$ Fig. 5. The rail is then rested against the inner surface of the gage $c'$ and run onto the saw, sawing out the relish, the stop $c^4$ checking the work so that the saw cuts just to the bit hole and not beyond. The rail is then passed along to the other side of the machine without shifting ends and the operation is repeated on the opposite end of the rail, the same face of the rail lying on the table. It will be seen that since the work is being gaged in each case from the same face, each bit will be in position to cut the tenon and each will be the same height above the table. When the work is pushed into the saw from the side that is ascending the stop $c^4$ tends to hold down the work during the sawing operation. When two men run the relishing portion of the machine, the rails are passed rapidly from one to the other as each completes one end and the work is done with far less handling than with the single acting machine when it was necessary to run through a quantity and pile them over and after adjusting the machine, run them through again. While the top and bottom rails are being relished on the relishing portion of the machines, the side rails may be grooved and bored on the rear portion of the machine. In operating the grooving portion, the rail is held against the gage $j^2$ and the hole bored. The rail is then run over the groover to a point where the saw reaches nearly to the hole, a mark being usually made on the table since this distance is not important.

My machine as thus organized, is capable of doing many times more work than the old form of relishing machine, since the rails do not have to be reversed or the machine adjusted between operations.

It is evident that the bits $e'$ may be stationary and the work fed to them and that many changes may be made in the machine without changing its principle.

The table should be so adjusted that the tenon will be as nearly as possible on a level with the center of the saw whereby the latter is less liable to cut into the shoulder at the base of the tenon.

I claim:—

1. In a relishing machine the combination of a table, a saw arbor and a saw thereon, said saw projecting above the table and in position to present opposite cutting edges and a cutting off bit on each side of the saw for cutting the base of the relish.

2. In a relishing machine, the combination of a table, a saw arbor and a saw thereon projecting above the table and positioned to cut a relish on either edge, a stop block adjacent to the upward moving edge of the saw positioned to hold the tenon down and impinge against the tenon shoulder.

3. In a relishing machine, the combination of an arbor, a saw on said arbor, a longitudinally movable bit arbor on each side of said saw arbor, and parallel therewith, a bit in each bit arbor, a gage adjacent to each bit for guiding the position of the tenon in line with the bit and a gage adjacent to the saw for guiding the relish to the saw.

4. In a relishing machine, the combination of a saw table, a saw arbor above said table, a saw on said arbor, a longitudinally movable bit arbor on each side of said saw arbor and parallel therewith, a bit on each bit arbor, a gage adjacent to each bit for guiding the position of the tenon in line with the bit and a gage adjacent to the saw for guiding the relish to the saw.

5. In a combined relishing and boring and grooving machine, the combination of a saw arbor, a saw on one end thereof, a longitudinally movable bit arbor on each side of said saw arbor and parallel therewith, a bit on each of said bit arbors, a gage for locating the tenon in line with each bit, a gage adjacent to the saw to guide the relish to the saw, a groover on the opposite end of the saw arbor, a grooving table for feeding work to said groover, a vertical and longitudinally movable bit shaft journaled beneath said table in line with said groover.

6. In a combined relishing and boring and grooving machine, the combination of a frame, a saw arbor journaled in said frame, a saw on one end of said arbor, a longitudinally movable bit arbor on each side of said saw arbor and parallel therewith, a bit on each of said bit arbors, a pulley on said saw arbor and each of said bit arbors, a pair of auxiliary pulley shafts journaled in the frame beneath the three arbor pulleys, auxiliary pulleys for said shafts, a driving pulley journaled beneath the two auxiliary pulleys, a belt running over said driving pulley, the two auxiliary pulleys and the three arbor pulleys, a groover on the other end of said saw arbor, a grooving table for feeding work to said groover, a hollow shaft journaled vertically beneath said grooving table, a miter gear on said hollow shaft, a miter gear on the end of one of said auxiliary pulley shafts engaging the miter gear on the hollow shaft, a spindle passing through said hollow shaft and longitudinally movable therein, a bit on the upper end of said spindle beneath said table and means for moving said spindle longitudinally.

In witness whereof I have hereunto set my hand this 28th day of December, 1909.

JOSEPH H. BURKE.

Witnesses:
S. W. BATES,
ELEANOR W. DERWINS.

Copies of this patent may be obtained for five cents each, by addressing the "Commissioner of Patents, Washington, D. C."